M. L. JOHNSON.
TELEPHONY.
APPLICATION FILED MAY 5, 1913.

1,119,355.

Patented Dec. 1, 1914.
10 SHEETS—SHEET 3.

WITNESSES
Etta L. White
Howard M. Cox

INVENTOR
MORTON L. JOHNSON
BY
ATTORNEY

M. L. JOHNSON.
TELEPHONY.
APPLICATION FILED MAY 5, 1913.
1,119,355.
Patented Dec. 1, 1914.
10 SHEETS—SHEET 7.
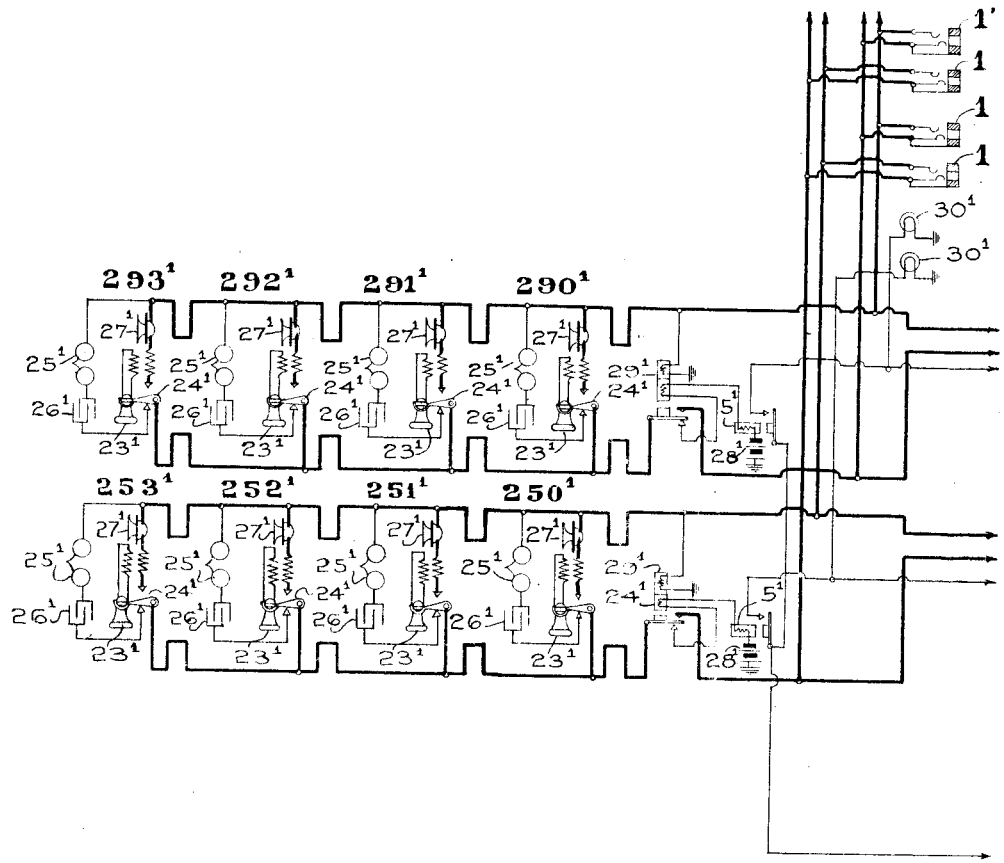
FIG - 7
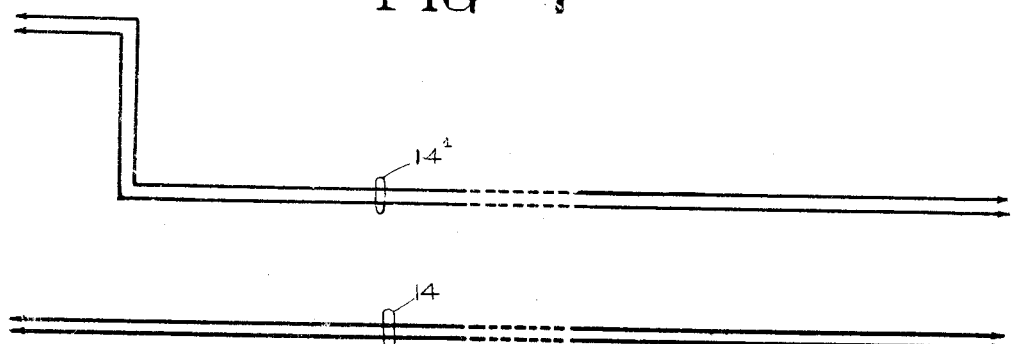
WITNESSES
Etta L. White
Howard M. Cox
INVENTOR
Morton L. Johnson
BY G. L. Gregg
ATTORNEY

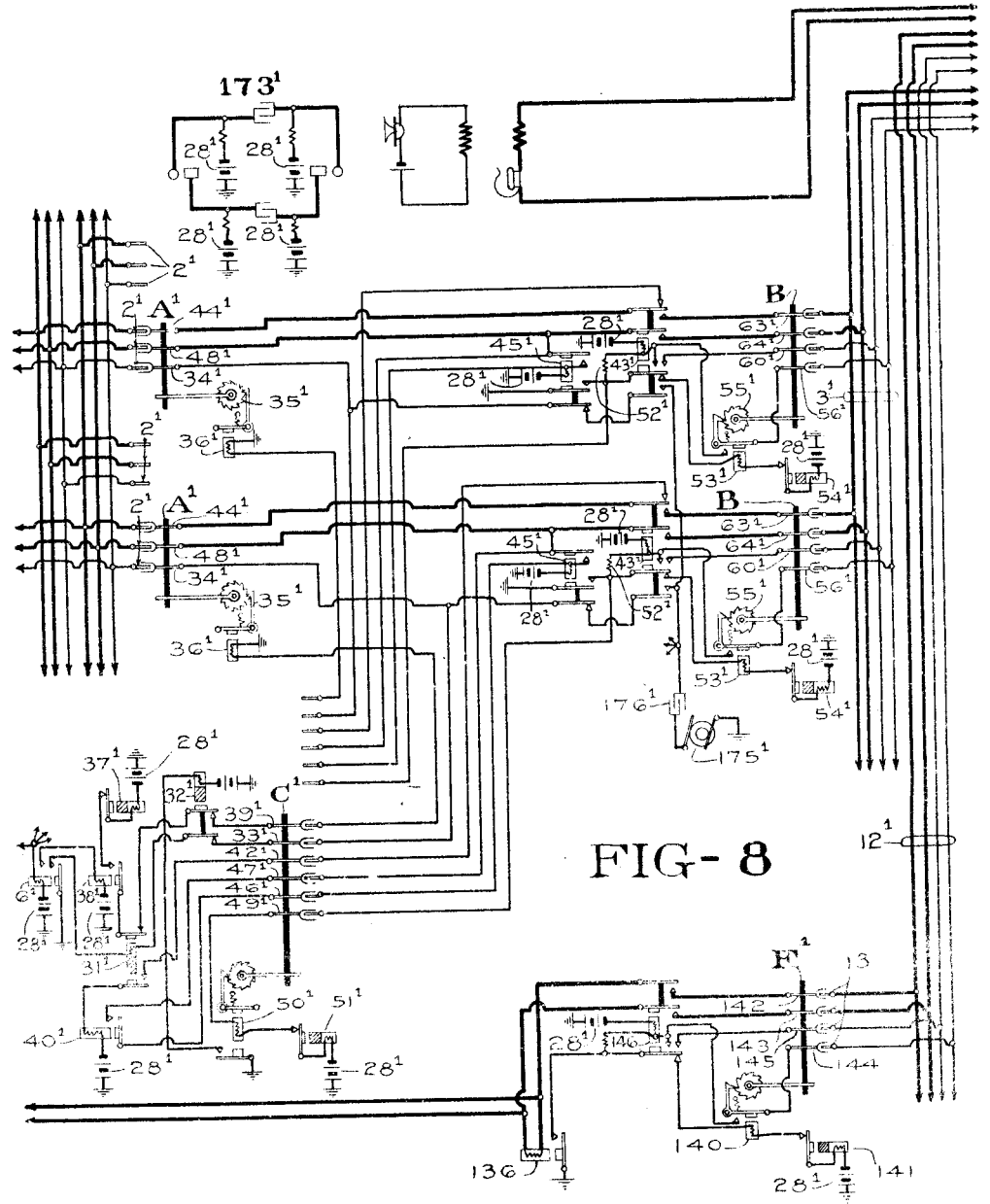

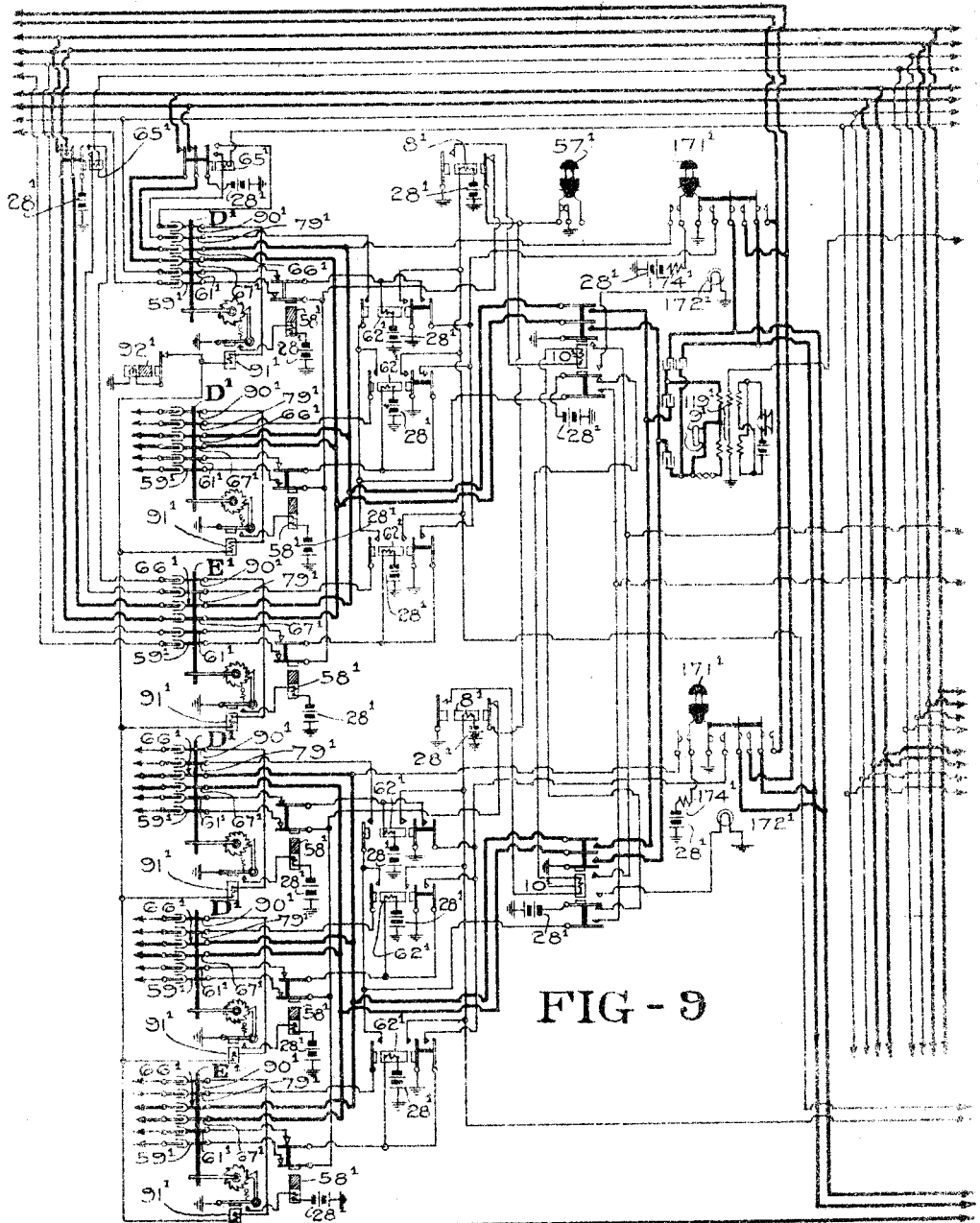

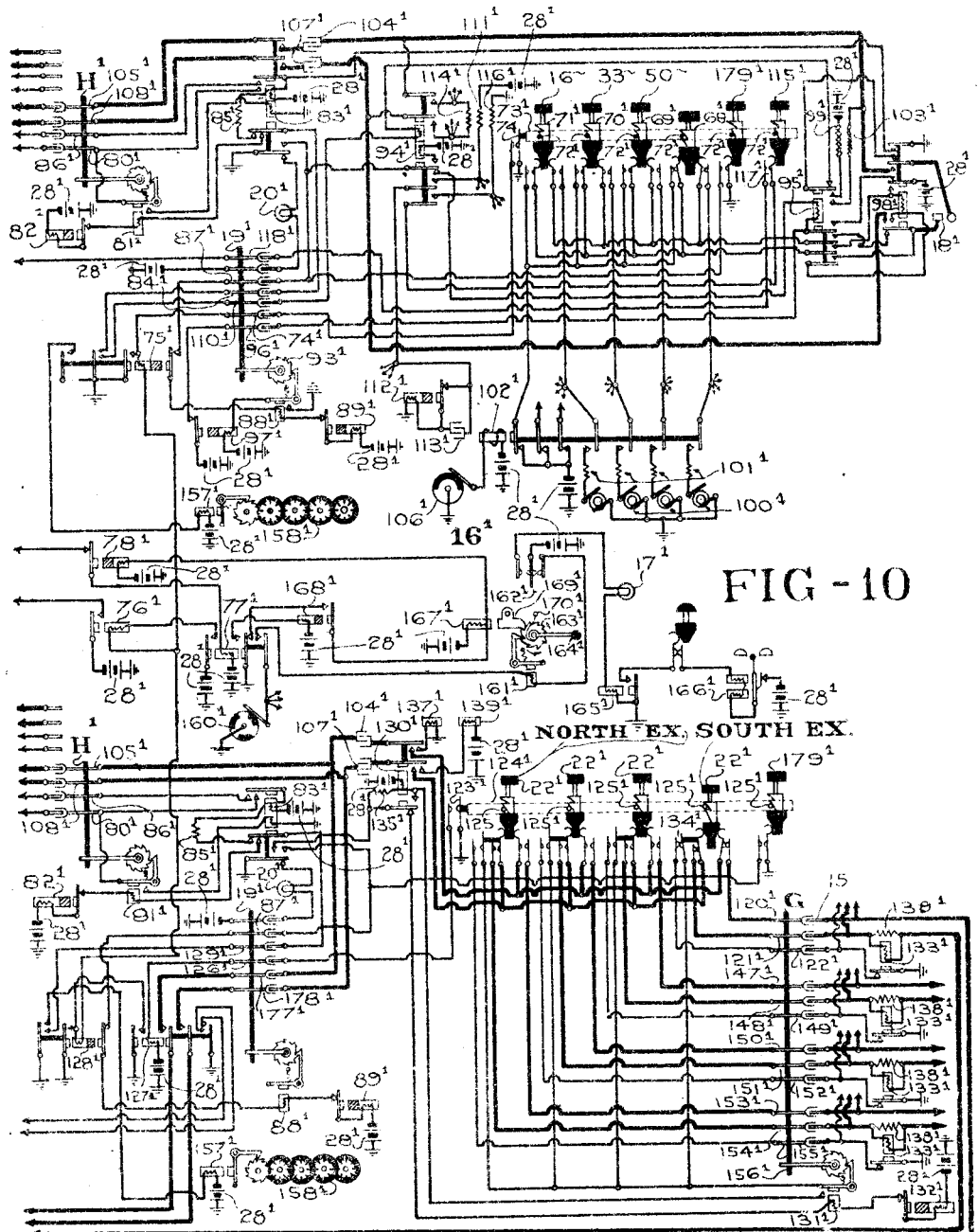

UNITED STATES PATENT OFFICE.

MORTON L. JOHNSON, OF CHICAGO, ILLINOIS, ASSIGNOR, BY MESNE ASSIGNMENTS, TO FRANK B. COOK COMPANY, OF CHICAGO, ILLINOIS, A CORPORATION OF ILLINOIS.

TELEPHONY.

1,119,355.  Specification of Letters Patent.  Patented Dec. 1, 1914.

Application filed May 5, 1913. Serial No. 765,583.

*To all whom it may concern:*

Be it known that I, MORTON L. JOHNSON, citizen of the United States, residing at Chicago, in the county of Cook and State of Illinois, have invented a certain new and useful Improvement in Telephony, of which the following is a full, clear, concise, and exact description, reference being had to the accompanying drawings, forming a part of this specification.

My invention relates to telephone exchange systems and has for its main object the provision of link connectors having an answering telephone line extension section and a plurality of connecting ends or telephone line extensions whereby an operator, after having effected connection with a calling line, may extend such calling line into connection with any telephone line extending to the other switching sections to which said connecting ends are individual without disarranging the connection with the calling line.

In the preferred embodiment of the invention the second telephone line extensions common to the first terminate in sets of wipers of an electro-magnetic switch and each of these sets of wipers is provided with a plurality of sets of waiting contacts constituting terminals of a set of additional telephone line extensions, each set of additional telephone line extensions extending to a different switching section.

I will explain my invention more fully by reference to the accompanying drawings illustrating the foregoing and other features of my invention and which drawings illustrate the preferred embodiment of the invention.

Figure 1:
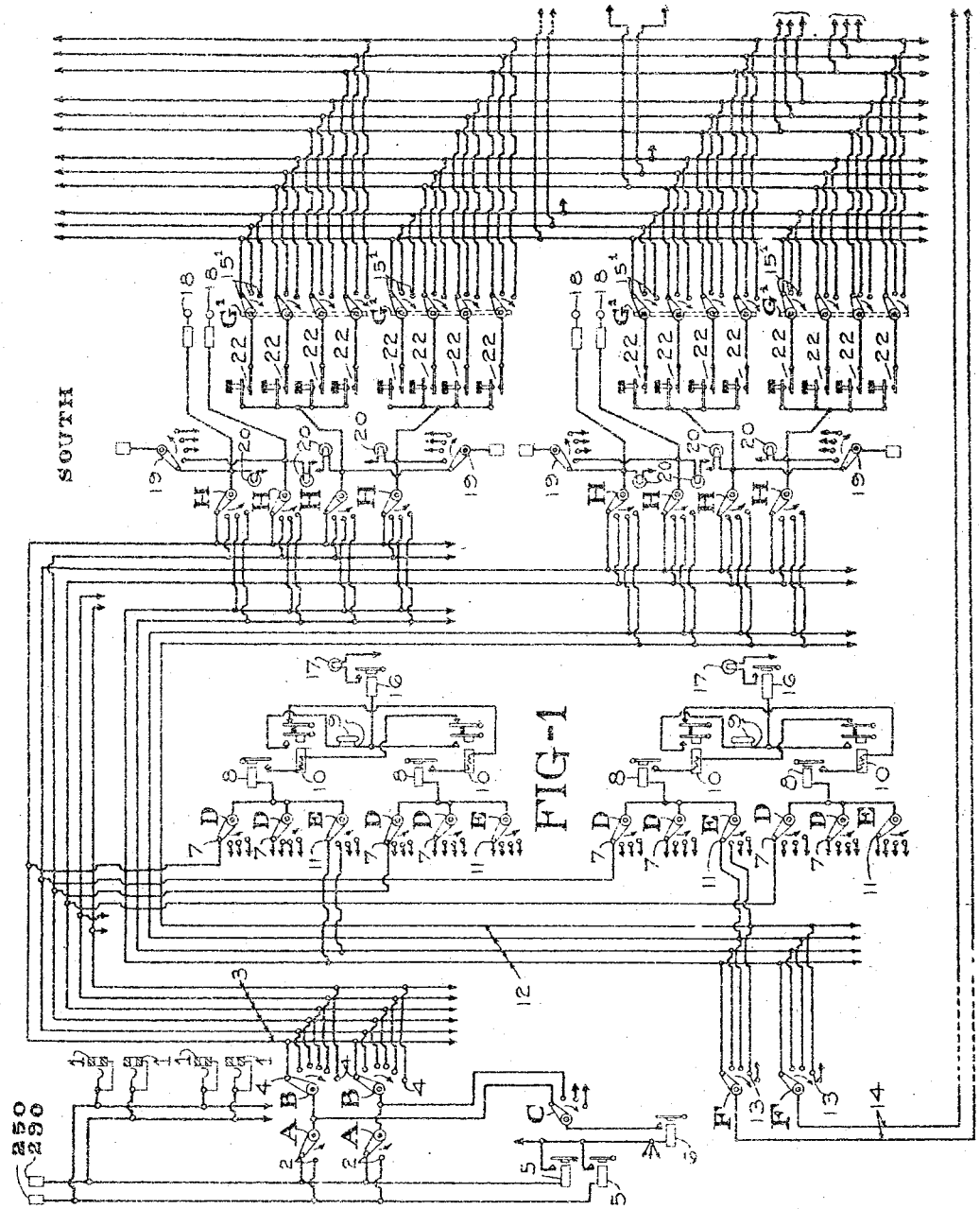
Figure 2:
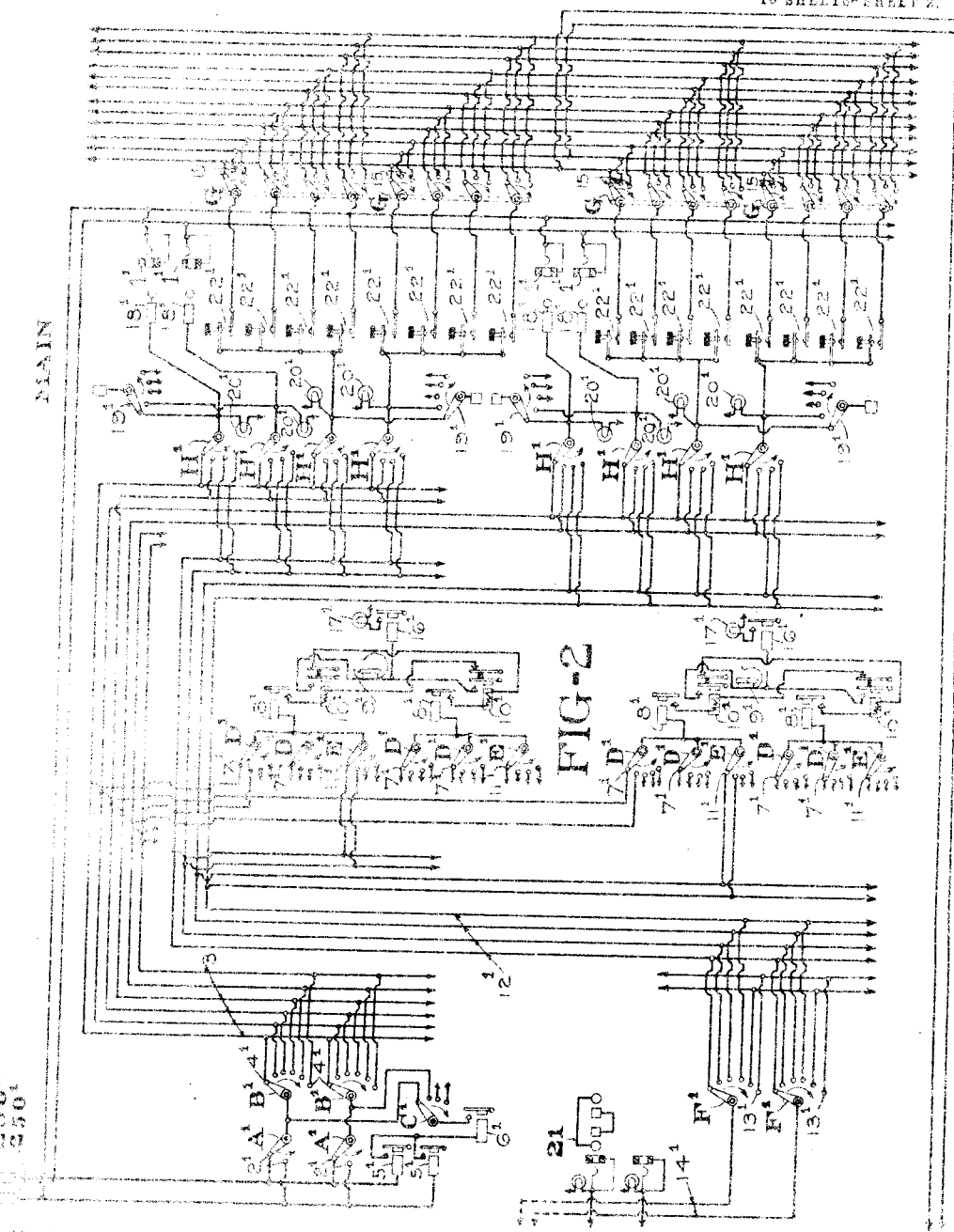
Figure 3:
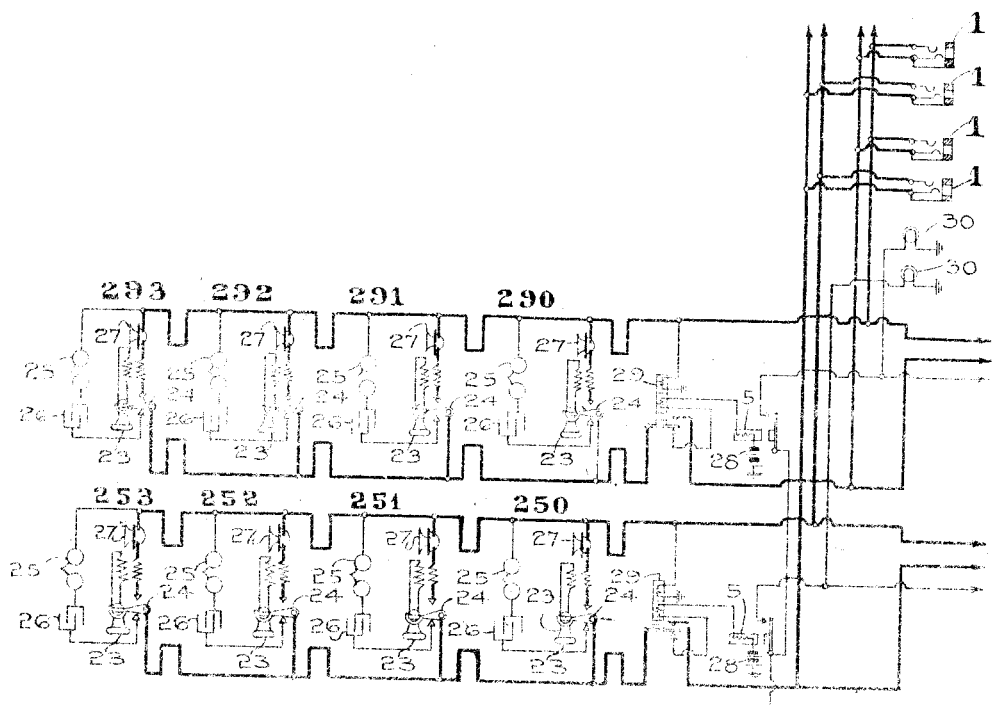
Figure 4:
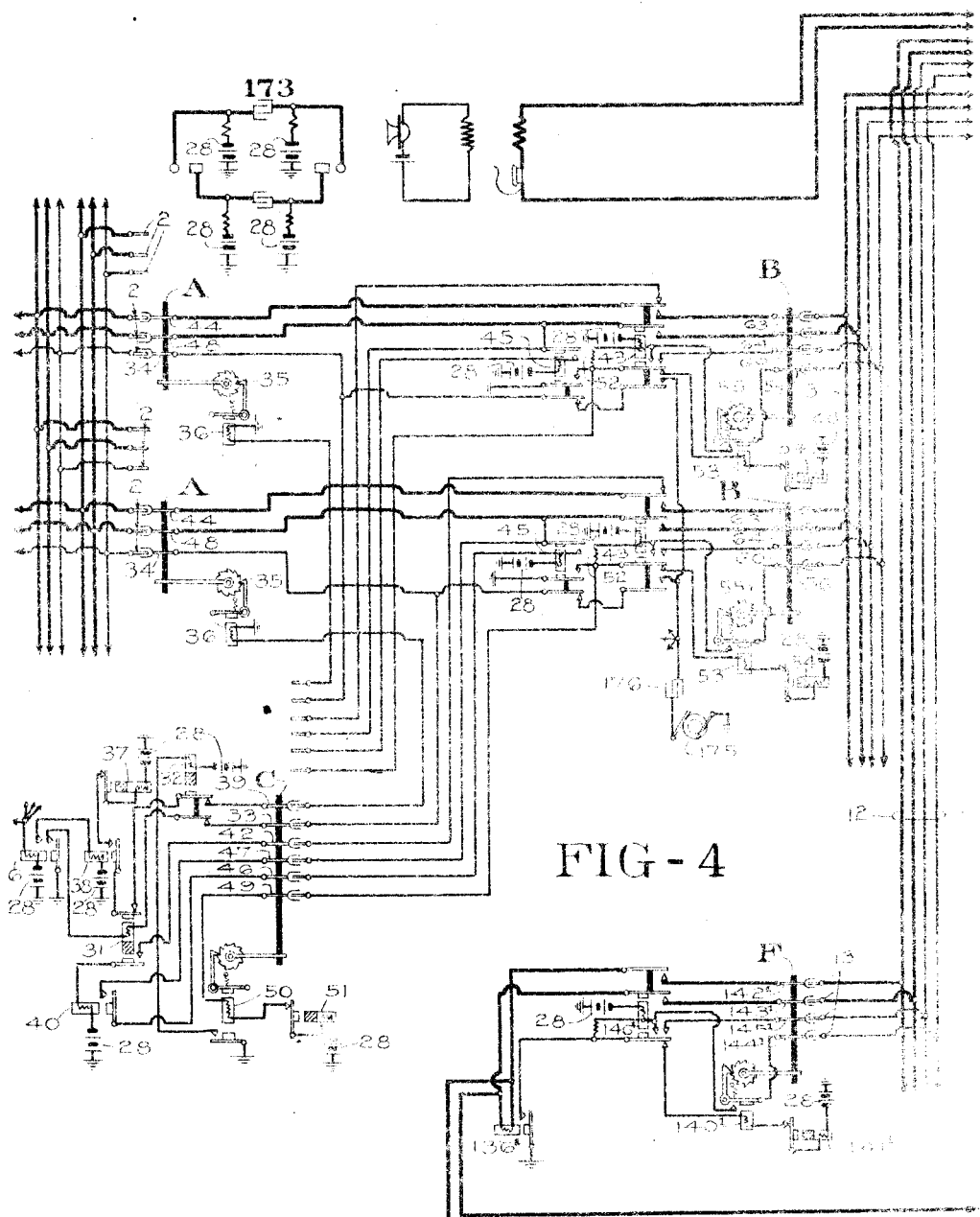
Figure 5:
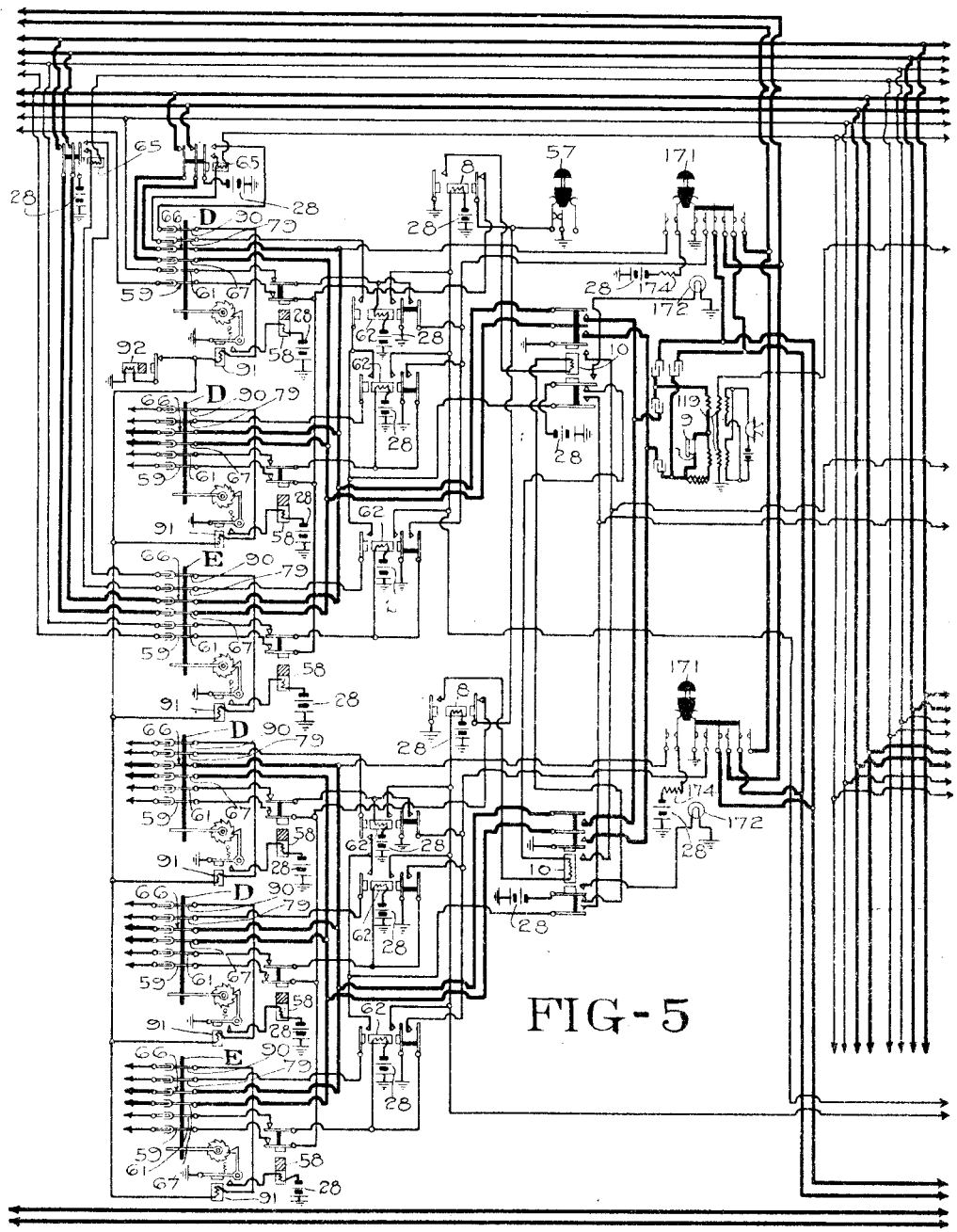
Figure 6:
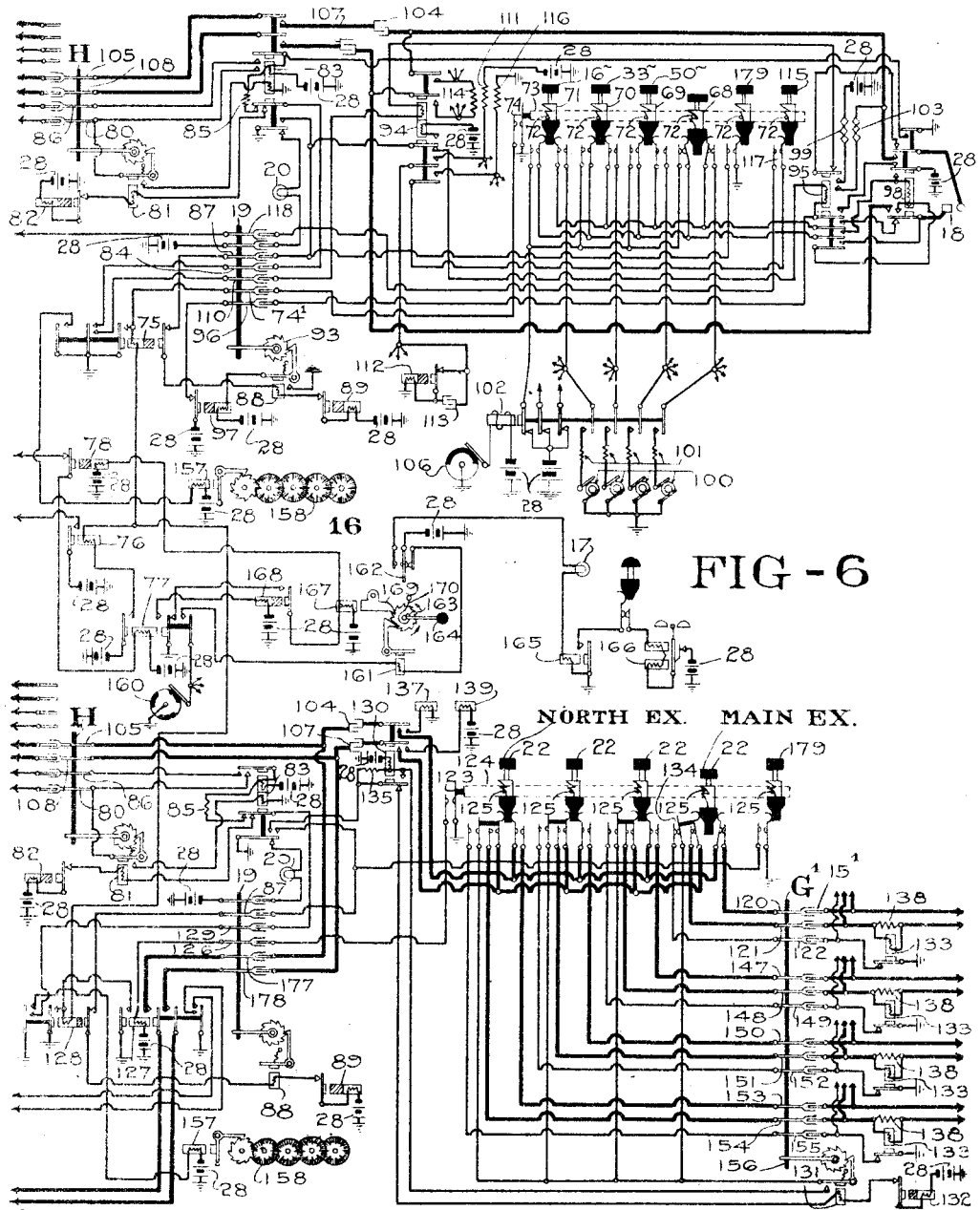

In the drawings Figures 1 and 2, taken collectively with the conductors at the left hand of Fig. 2 in alinement with the conductors at the right hand of Fig. 1, indicate the general plan of a system equipped in accordance with the invention; and Figs. 3 to 10, taken in consecutive order, together illustrate one embodiment of my invention as it has been practiced, substantially.

Referring first to Figs. 1 and 2, taken collectively, I have there diagrammatically outlined a telephone exchange system, two subscribers' substations 250 and 290 being indicated, the lines from these substations extending to an exchange where each is provided with multiple jacks 1 distributed among different sections of a manual switchboard at one exchange. Each subscriber's line is also provided with a plurality of multiply related sets of contacts 2, the sets of waiting contacts pertaining to each line being distributed among calling line finder switches A, each finder switch having a set of waiting contacts 2 pertaining to each of the lines. In practicing the invention the subscribers' telephone lines are desirably divided into groups, fifty lines per group, each group having five calling line finder switches A, each finder switch having fifty sets of waiting contacts 2, each set of waiting contacts pertaining to a different telephone line of the group of fifty. I provide a group of, say twenty-five, calling telephone line extensions 3 for each collection of ten groups of subscribers' lines, that is each group of twenty-five calling line extensions 3 is individual to each larger group of five hundred subscribers' lines. Each calling line extension 3 is provided with a plurality of multiply related sets of contacts 4, each set of waiting contacts 4 pertaining to each calling line extension being included in a calling line extension selector switch B, each selector switch having a set of waiting contacts 4 pertaining to each calling line extension. One calling line extension selector switch B is shown as being individual to each calling line finder switch A so that each calling line extension 3 has a set of waiting contacts 4 in each of fifty switches B. When a call is initiated the calling subscriber, as a consequence of the removal of his receiver from its switch hook, energizes a line relay 5 to close the circuit of relay 6 common to the group of fifty lines in which the calling line is included, the relay 6 closing the circuit of a driving magnet of the switch A which happens to be associated with the calling line by means of the master switch C provided with waiting contacts individual to the different switches A in the group of fifty lines, the wipers of the switch C being common to the lines of this group and normally resting upon a set of waiting contacts pertaining to some idle switch A. The wipers of the switches A normally rest upon waiting contacts belonging to the telephone lines and, of course, are not stepped off of such contacts when the engaged contacts pertaining to the calling lines are engaged by the wipers of the switches associated with such lines. When the switch A which has been set into operation has found the calling line or is already in connection with the calling line, the wipers of switch C are moved into engagement with waiting contacts pertaining to some other and idle switch A and the switch B individual to the operated switch A is set in motion to find an idle calling line extension 3.

Assuming that the system includes two thousand subscribers' lines which are divided into forty lesser groups of fifty lines per group and four major groups each including ten lesser groups or five hundred lines. Each of the four groups of calling telephone line extensions 3 is desirably distributed among five operators who have charge of five subgroups of calling line extensions 3 in each of the four groups of calling line extensions, each operator thus having charge of twenty calling line extensions made up of five such extensions from each of the four groups of extensions. The drawings do not permit of the full diagrammatic illustration of such an arrangement, but two operators' positions being illustrated in Fig. 1 among which the telephone line extensions 3 which are illustrated in this figure are distributed, the calling line extensions alternately extending from the waiting contacts 4 to the two operators. In the larger equipment the calling line extensions would preferably extend in successive order from the waiting contacts 4 to the five operators, that is, the extension 3 extending from the first set of waiting contacts would extend to the first operator, from the second set of waiting contacts to the second operator, from the third set of contacts to the third operator, from the fourth set of contacts to the fourth operator, from the fifth set of contacts to the fifth operator, from the sixth set of contacts to the first operator, and so on. The extensions 3 are provided with waiting contacts 7, each set of waiting contacts 7 being individual to an extension and an operator's selector switch D. Each operator may have more than one switch D, each switch having waiting contacts 7 though but one switch is adapted at a time to connect the operator's telephone equipment pertaining thereto with the associate calling line extension. In the two thousand line equipment taken for illustration each operator has four switches D, the topmost switch pertaining to five of the group of twenty-five calling line extensions 3 that is individual to the major group of subscribers' lines numbered from one to five hundred inclusive, the next lower switch D pertaining to five of the group of twenty-five calling line extensions 3 that is individual to the major group of subscribers' lines numbered from five hundred one to one thousand inclusive, the third switch D pertaining to five of the group of twenty-five calling line extensions 3 that is individual to the major group of subscribers' lines numbered from one thousand one to fifteen hundred inclusive, the fourth switch D pertaining to five of the group of twenty-five calling line extensions 3 that is individual to the major group of subscribers' lines numbered from fifteen hundred one to two thousand inclusive. Thus each switch D at each operator's position and each switch D at all of the operators' positions are exclusively associated with five calling line extensions whereby it is possible for any one of the two thousand subscribers' lines to have access to any of the five operators when idle. The switches D at each operator's position are divided into two pairs, each pair having a relay 8 common thereto, each relay 8 thus being common to ten calling line extensions 3, such relay operating to limit the connection of the associate operator's telephone 9 to but one of the ten telephone line extensions 3 to which such relay is common. Each relay 8 is accompanied by an additional relay 10 individual thereto. When the relay 10 pertaining to an employed relay 8 and an employed switch D is energized it will permit the other relay 8 to operate and hold a calling line ready for association with the telephone equipment 9 as soon as the first relay 8 is released, which latter event occurs when the operator has put up the desired connection wholly or partially according to the nature of the connection desired. As the invention is illustrated the wipers of the switches D normally rest upon the waiting contacts 7 pertaining to idle calling line extensions 3 so that calling subscribers are brought into telephonic connection with the operators just as soon as the operators have performed their duties, or immediately if the operators happen to be idle. Each pair of switches D may be supplemented by a third switch E having waiting contacts 11 which pertain to trunk line extensions 12 extending to waiting contacts 13 included in switches F that are individual to trunk lines 14 that extend to waiting contacts 15 of switches G located in another exchange, where they may be operated to bring a calling line extending to the latter exchange into connection with an idle operator's telephone set 9 by way of the switches F and E, but one switch in each of the two groups D, D, E belonging to each operator being of service at a time to extend the operator's telephone connection, the elements 8 and 10 performing the functions in connection with each set of three switches D, D, E as hitherto described so that if one switch D or E of one set has extended the connection of the operator's telephone a switch D or E in the companion set may be in readiness to extend such connection when the first employed switch has been released. A timing device 16 is individual to each operator's telephone line and when an operator's telephone has had its connection extended beyond the predetermined period of time the element 16 will operate to display a signal at 17 which may be in the presence of a supervisory operator.

When the calling subscriber has selected the telephone equipment 9 of an idle operator, the operator is informed of the number of the line desired by the calling subscriber and the selected operator will set a switch H into operation to extend the calling line extension 3 connected with the calling line into connection with the link connector which is to be employed by the operator in extending the calling line into connection with the desired line. If the desired line extends to the same exchange with the calling line the operator will employ a link connector having a connecting plug 18 which the operator will insert in the jack 1 of the desired line. If the desired line extends to another exchange the operator will employ a link connector having a selector switch $G^1$ companion to the switch H and which selector switch will extend such link connector into connection with conductors extending to the other exchange where the connection between the calling and desired lines is finally effected. The link connectors to be employed are desirably automatically predetermined by selector switches 19 common to the link connectors of each kind at each operator's position. These selector switches 19 automatically bring their wipers into engagement with waiting contacts pertaining to idle link connectors and occasion the operation of signal devices 20 individual to the link connectors that have been automatically selected by the selector switch 19. The operator thus appropriates for use only those link connectors of the kind desired in connection with which a signal lamp 20 glows. Each selector switch $G^1$ is illustrated as having four sets of wipers traveling in fixed planes or levels, the waiting contacts of each level belonging to telephone line extensions extending to different operators' positions at the same or different exchanges, similarly positioned waiting contacts in the various switches $G^1$ of the different operators being multipled whereby any operator may have access to various positions that the switches $G^1$ are designed to reach. In the example chosen four sets of wipers are illustrated for each switch $G^1$, the uppermost set of wipers being designed for extending calling lines (250, 290), extending to the south exchange, to the main exchange, the next set of wipers serving to extend the calling lines to the information operator's position indicated at 21, the next set of wipers extending the calling lines to a toll operator's position and the bottom set of wipers extending the calling lines to the north exchange. The four sets of wipers thus constitute a group of connecting terminals which are common to a single link connector having a complemental end common to the connecting ends of the link connector for connection with the calling lines and while the operator is provided with equipment for bringing the link connectors into connection with calling lines by her own action the invention is not thus to be limited and while the multipled connecting ends of each link connector are in the form of traveling wipers belonging to electro-magnetic switches, the invention is not thus to be limited. A plurality of sets of waiting contacts are provided for each set of wipers, these waiting contacts constituting terminals of additional telephone line extensions which extend to a plurality of switching sections.

It is usually necessary to be able to limit the conversation to two connected stations to which end the operator is provided with switching mechanism 22 individual to each set of wipers for alone bringing such set of wipers into the established telephonic circuit, the remaining sets of wipers being excluded from telephonic connection owing to the idle condition of the switches 22 individual thereto. There is thus provided a telephone exchange system including telephone lines extending to one switching section, telephone lines extending to other switching sections, and a link connector intervening between the first switching section and the other switching sections, said link connector including a telephone line extension for connection with a telephone line extending to the first switching section, and a telephone line extension for each of the second switching sections for extending the telephone lines extending thereto, the first telephone line extension being common to the latter telephone line extensions and the latter telephone line extensions being in permanent circuit relation with the former. In the embodiment of the invention illustrated these latter telephone line extensions terminate in wipers and while these wipers and the extensions connected therewith are preferably in permanent circuit relation with the first telephone line extension the invention is not to be limited to such a characteristic as I believe it to be broadly new with me to provide an electro-magnetic switch adapted to connect one switching section with a plurality of other switching sections by means of a single line extension that may be interchangeably associated with the wipers.

If the calling subscriber should desire connection with a subscriber whose line extends to the main exchange the topmost switch 22 will be operated, the operation of the switch G¹ following until the set of wipers individual to the actuated switch 22 encounters a trunk 14¹ terminating in the wipers of an idle selector switch F¹ preferably located in the main exchange. The switch F¹ will thereupon operate to connect the trunk 14¹ with an idle trunk extension 12¹, the trunk extensions 12¹ being connected with waiting contacts in switches E¹, these trunk extensions 12¹ being apportioned among the operators' positions having telephone equipment 9¹, the wipers of the switches E¹ normally resting in connection with waiting contacts belonging to idle trunk line extensions 12¹ whereby an operating switch F¹ will automatically bring the waiting idle operator into connection with the calling subscriber. The calling subscriber will inform the operator having the selected equipment 9¹ of the number of the desired line and this operator will insert a plug 18¹ into the spring jack 1¹ of the desired line and will also set the wipers of the switch H¹ individual to the plug 18¹ to bring these wipers into connection with waiting contacts belonging to the employed trunk line extension 12¹. Equipment at and pertaining to the main exchange includes apparatus which is similar to equipment at and pertaining to the south exchange. The equipment at and pertaining to the main exchange which is similar in function and operation to the equipment at and pertaining to the south exchange is given similar characters of reference with the addition of prime marks as exponents, it being thereby unnecessary to repeat the description of the operation of the equipment at and pertaining to the main exchange, it being only required to state that the upper switches 22¹ at each operator's position at the main exchange are employed to connect a main exchange calling subscriber with a south exchange called subscriber.

Reference will now be made more particularly to Figs. 3 to 10 inclusive for a more detail description of the operation of the system. Assuming that the subscriber at station 250 desires communication with a subscriber at station 290 the lines of these two stations entering the same exchange. The calling subscriber will remove his telephone receiver 23 from its switch hook 24 whereby the switch hook is removed from its normal contact that normally includes the bell 25 and the condenser 26 in bridge of the telephone line, such switch thereupon engaging its alternate contact to include the telephone transmitter 27 at the calling station in bridge of the calling line. When this bridge is established a circuit is closed which is traceable from the grounded common battery 28, the relay 5, the lower winding of the cut-off relay 29, the armature switch of this relay and the normal contact of this armature switch, the transmitter bridge at the calling station, to the grounded upper winding of the relay 29, the two coils of the relay 29 being equal and differential. The relay 5 establishes a circuit traceable from the grounded battery 28, through the relay 6, (common to a group of fifty lines), the armature switch of relay 5 and its then engaged contact, to the grounded line signal 30, the signals 30 not being used by the operators in the normal operation of the exchange, being merely provided to indicate trouble and for overflow calls. The grounded armature switch of relay 6 first establishes a circuit traceable from this switch, the contact thereof immediately adjacent thereto, the sluggishly operating relay 31, the lower armature switch of the sluggishly operating relay 32 and its normally engaged contact, the wiper 33 of master switch C common to a group of fifty lines, the waiting contact with which this wiper 33 happens to be connected (the wipers of the switch C being normally connected with waiting contacts pertaining to some unemployed switch A), the wiper 34 of the switch A that happens to be associated with the switch C, the waiting contact engaged by the wiper 34 and, assuming for one example that the waiting contact engaged by the wiper 34 pertains to the calling line, the armature switch of relay 5 of the calling line and its engaged contact, the relay 6, to be grounded battery 28. Assuming, for another example, that the wiper 34 does not happen to be connected with the calling line then circuit would be open at the relays 5 pertaining to the noncalling lines with which the switch A is connected and over whose contacts the wipers of this switch may pass, the wipers of the switch A being driven to seek the contacts of the calling line by the operation of the ratchet wheel 35 set into operation by the motor magnet 36, this motor magnet having had circuit established therefor traceable from the grounded battery 28, the sluggishly operating relay 37, the armature switch of this relay, the contact engaged thereby, the armature switch of relay 38 (whose circuit is the second to be established by the relay 6 at the contact second to be engaged by the armature switch of relay 6), the contact of the armature switch of relay 38, the upper armature switch of relay 31 and its engaged contact, the upper armature switch of relay 32 and its engaged contact, the wiper 39 of switch C, the waiting contact happening to be engaged by this wiper, to the grounded motor magnet 36.

The relay 37 is a circuit interrupting relay to interrupt the circuit just traced from the motor magnet 36 whereby the ratchet wheel 35 is stepped around until the wiper 34 engages the waiting contact pertaining to the calling line and connected with the contact of the armature switch of the relay 5 of the calling line. When the wiper 34 is thus brought into engagement with such a waiting contact or if it happens already to be in engagement with such a waiting contact, the relay 31 is energized through the circuit previously traced for it to attract its armature switches thereby to open the circuit for the motor magnet 36 at the upper armature switch of relay 31 to arrest the wipers of the employed switch A when they were moved into engagement with the waiting contacts of the calling line or to prevent the movement of such wipers if they already happen to be connected with the waiting contacts of the calling line. The energized relay 31 closes circuit at its lower armature switch traceable from the grounded battery 28 through the relay 40, the lower armature switch of relay 31 and its then engaged contact, the wiper 42 and the waiting contact engaged thereby, the uppermost armature switch of relay 43 and its normal contact, the wiper 44 of the employed switch A, the waiting contact 2 of the calling line engaged thereby, to the upper grounded coil of the differential cutoff relay 29. The relay 29 is thus unbalanced and is energized to move its armature switch into engagement with its alternate contact to close the circuit traceable from the grounded battery 28, the relay 45, the wiper 46 of the switch C and the waiting contact engaged thereby, the armature switch of energized relay 40 and its contact, the wiper 47 and waiting contact engaged thereby, the wiper 48 of the employed switch A and the waiting contact of the calling line engaged thereby, the alternate contact of the armature switch of relay 29, said armature switch, both sides of the calling line to the upper grounded winding of the relay 29. The relay 45 is thus energized to attract its armature switches, the uppermost armature switch closing a holding circuit for the relay 45 that includes the grounded battery 28, the relay 45, the upper armature switch of this relay and its engaged contact, the wiper 48 connected with the calling line, both sides of the calling line and the upper grounded coil of the relay 29 of the calling line. The intermediate armature switch of the energized relay 45 establishes a circuit traceable from ground, said armature switch, the contact engaged by this armature switch, the wiper 49 of the employed switch C, the waiting contact engaged by this wiper, the motor magnet 50, the circuit interrupter relay 51, the armature switch and contact of this relay, to the grounded battery 28, the relay 51 interrupting the circuit thus established intermittently to energize the motor magnet 50 to move the wipers of the switch C until the wiper 49 engages an ungrounded contact pertaining to some unemployed switch A of the group to which the switch C is common, the waiting contacts engaged by the wipers 49 that pertain to employed switches A being grounded. The intermediate armature switch of relay 45 also establishes a circuit traceable from ground, through said armature switch, the contact engaged by said armature switch, the resistance 52, say of a thousand ohms, the relay 43, to the grounded battery 28, the resistance 52 being sufficient to prevent the relay 43, which is say of 250 ohms, from being operated but permitting this relay 43 to become sufficiently energized so as to be very sensitive in order properly to effect operations to be described. A third circuit is also established by the intermediate armature switch of relay 45 that continues therefrom through the next to the lowermost armature switch of relay 43, the normal contact of this armature switch, the motor magnet 53 of switch B individual to the employed switch A, the armature switch of the circuit interrupting relay 54 and the contact of this armature switch, to the grounded battery 28. The motor magnet 53 is thus operated to move the ratchet wheel 55 that moves the wipers of the switch B until the wiper 56 engages a grounded waiting contact pertaining to one of the four strands of an unemployed calling line extension 3 that is associated with an unemployed operator selector switch D.

The circuit established by the wiper 56 when engaging a grounded waiting contact is traceable from the grounded contact of the key 57, the spring of this key then engaging the same, the armature switch of relay 8 and its normal contact, the lower armature switch of sluggishly operating relay 58 and its contact, the wiper 59 of the operator selector switch D, which wiper 59 is in engagement with a waiting contact belonging to a strand of the calling line extension 3 engaged by the wiper 56 of the employed switch B, this strand of the calling line extension 3, the waiting contact engaged by the wiper 56 and belonging to said strand, the armature of motor magnet 53, the contact of this armature, the relay 43 to the grounded battery 28. The circuit through the relay 43 is but momentarily established during the momentary attraction of the armature of relay 53, the relay 43 being, however, charged as previously described so that it will quickly and properly perform its function when circuit is thus momentarily established therethrough. When relay 43 is energized a locking circuit is established for it traceable from the grounded battery 28, the winding of relay 43, the lower intermediate armature switch of this relay and its left hand alternate contact, the intermediate armature switch of relay 45 and its contact, to ground. The relay 43 being energized, the circuit for the motor magnet 55 is broken at the normal contact of the lower intermediate armature switch of this relay so that the wipers of the employed switch B remain at rest in association with the employed calling line extension 3. When the relay 45 is energized a circuit is established traceable from the grounded intermediate armature switch of relay 45, the contact of this switch, the lower intermediate armature switch of relay 43 and the right hand alternate contact of this armature switch, the wiper 60 of the employed switch B, a waiting contact belonging to another strand of the employed calling line extension 3, the wiper 61 of the employed switch D and the contact engaged thereby, the upper armature switch of relay 58 and the contact engaged thereby, the relay 62, to the grounded battery 28. The intermediate armature switch of the energized relay 62 establishes a circuit traceable from ground, through this armature switch and its contact, the relay 8, to the grounded battery 28. The right hand armature switch of relay 8 thereupon leaves its contact to remove ground from the lower armature switches of the relays 58 pertaining to the operator selector switches in the group of three switches D, D, E containing the employed switch D and the relay 8 common thereto to remove ground from the waiting contacts pertaining to the wipers 56 of the various switches B having access to the calling line extensions 3 provided with waiting contacts present in the switches D, D of the aforesaid group of switches D, D, E. The left hand armature switch of said relay 8 engages its contact to establish a circuit traceable from ground through this switch and its contact, the winding of relay 10 individual to the relay 8, the next to the bottom armature switch of relay 10 individual to the relay 8 that is companion to the aforesaid relay 8, to the grounded battery 28, assuming that none of the switches D, D, E to which the second relay 10 pertains is employed in which event the second relay 10 is deënergized. If the second relay 10 is energized the first relay 10 has its winding in open circuit at the normal contact of the next to the bottom armature switch of the second relay 10 whereby the first relay 10 remains deënergized to prevent the telephone outfit 9 at the selected position and common to both relays 10 from being employed in circuit with the calling line at the two uppermost switches of the first relay 10. When the second relay 10 is deënergized the winding of the first relay 10 is included in the circuit previously traced so that all of the armature switches of the first relay 10 are attracted, the two uppermost armature switches of the first relay 10 then including the selected telephone line in circuit with the calling subscriber who informs the operator of the connection desired. The first relay 10, now being energized, opens the circuit of the winding of the second relay 10 at the normal contact of the next to the bottom armature switch of the first relay 10 to prevent the second relay 10 from being operated for the purpose now understood. The talking circuit between the calling subscriber and the selected operator is apparent, it being only necessary to state that it includes the wipers 14, 18 of the employed switch A, the two upper armature switches of the relay 43 and their engaged contacts, the wipers 63, 64 of the switch B individual to the employed switch A, the two left hand strands, the talking strands, of the employed calling line extension 3, the two left hand armature switches of relay 65 and their engaged contacts, the wipers 66 and 67 of the employed operator selector switch D, the two uppermost armature switches of the first relay 10 and their engaged contacts and the operator's outfit 9.

Assuming that the connection desired by the calling line is for a station, say 290, whose line extends to the same exchange with the calling line, the operator will employ a free plug 18 and insert it in the jack 1 of the desired line. In the employment of the invention illustrated the desired station 290 is upon the same party line with other stations 291, 292, 293 and if such stations are provided with selective signals the operator will depress the key 68 individual to the signal receiver at the wanted station. The key 68 and the keys 69, 70 and 71 respectively individual to the signal bells of stations 291, 292, 293 are provided each with a plunger having two notches, these plungers being in engagement with pins 73 upon a bar 72 which is pressed by a spring 74 to maintain the pins in engagement with the plungers. When any key is depressed the key previously depressed is automatically restored when its pin 73 is moved out of engagement with its stem. After the plug is inserted in the jack 1 of the desired line the key 68 is fully depressed thereby to establish a circuit traceable from the grounded spring 74, the contact engaged by this spring only so long as the actuated key is fully depressed, the wiper 74' of the jack designating switch 19 and the contact happening to be engaged by this wiper, the winding of sluggishly operating relays 75, the winding of relay 76, the left hand armature switch of relay 77 and its contact, to the grounded battery 28, the relay 77 having been previously energized by a circuit traceable from the intermediate grounded armature switch of the employed relay 10, the contact of this armature switch, armature switch of sluggishly operating relay 78 and its engaged contact, the winding of relay 77, to the grounded battery 28. The relay 77 is under the calling subscriber's control so as to prevent the operator from operating the relay 75 faultily. The relay 75 establishes a locking circuit for itself traceable from the left hand grounded armature switch immediately adjacent the winding of this relay, winding of relay 75, the winding of relay 76, the left hand armature switch of relay 77 and its contact, to the grounded battery 28. The operator controlled relay 76 thereupon establishes a path traceable from the grounded battery 28, the armature switch of relay 76 and its engaged contact, the bottommost armature switch of the employed relay 10 and its engaged contact, the left hand armature switch of relay 62 and its engaged contact, the wiper 79 of the employed switch D, the waiting contact engaged by this wiper, the winding of relay 65, to the waiting contact for the wiper 80 pertaining to the switch H companion to the employed plug 18 and pertaining to the calling line extension 3 which the calling subscriber has selected and connected with his line through the agency of switches A and B. A circuit is established for the motor magnet 81 of the switch H traceable from the grounded battery 28, the circuit interrupting relay 82, the armature switch of this relay 82, the motor magnet 81, the next to the bottom armature switch of relay 83, the right hand contact of this armature switch, the wiper 84 of the employed switch 19, and the contact engaged thereby, the upper contact of the second grounded armature switch to the left of the winding of relay 75, this armature switch, to ground. The wipers of the switch H will automatically turn until the wiper 80 engages the waiting contact pertaining to the strand of the calling subscriber selected calling line extension 3 which is connected directly with grounded battery at the armature switch of relay 76 through relay 65 and is free from direct ground. When the wiper 80 engages this waiting contact a circuit is continued from the path previously traced up to this waiting contact of the wiper 80 through the wiper 80, the armature of motor magnet 81, the contact momentarily engaged by this armature, the lower winding of relay 83, to ground, this relay having been previously partially energized, so as to be ready to operate, by a circuit traceable from the second grounded armature switch to the left of the winding of relay 75, the upper contact of this armature switch, the wiper 84 and the contact engaged thereby, the next to the bottom armature switch of relay 83 and the left hand contact of this armature switch, the resistance 85, the upper winding of relay 83, to the grounded battery 28, the resistance 85 being say of one thousand ohms while the resistance of the upper winding of relay 83 is say of two hundred fifty ohms.

When the previously partially energized relay 83 is completely energized upon the momentary engagement of the armature of the motor magnet 81 with its contact, the armature switches of the relay 83 are attracted whereby the circuit of the motor magnet 81 is opened at the right hand contact of the second from the bottom armature switch of relay 83 so that the wipers of the employed switch H remain at rest in association with the calling line extension 3 which the calling subscriber has connected with his line. The relay 83 establishes a locking circuit for itself traceable from the grounded battery 28, the upper winding of relay 83, the intermediate armature switch of this relay, the uppermost contact of this armature switch, the wiper 86 of the switch H, the waiting contact engaged thereby, the wiper 60 of the switch B and the waiting contact engaged thereby, the right hand alternate contact of the next to the bottom armature switch relay 43 and said armature switch, the intermediate armature switch of relay 45 and its contact, to ground. Relay 65 which was energized when relay 83 was energized has a locking circuit established for itself traceable from the grounded battery 28, the right hand armature switch of relay 65, the lower contact of this armature switch, the winding of relay 65, the wiper 80 of switch H and the contact engaged thereby, the lower contact of the intermediate armature switch of relay 83, and the upper contact of this armature switch, to ground by way of the wiper 86. The bottom armature switch of relay 83 leaves its normal contact and engages its alternate contact to establish a circuit traceable from ground, through said armature switch, the alternate contact thereof, the wiper 87 of the switch 19, the right hand armature switch of relay 75 and its contact, the motor magnet 88 of the switch 19, the circuit interrupting relay 89, by way of its armature switch and contact, to the grounded battery 28; it being stated in passing that the relay 75 was previously deënergized owing to the circuit established by the relay 65 traceable from the grounded battery 28, the right hand armature switch of this relay, the upper contact of this armature switch, the wiper 90 of switch D, the waiting contact engaged by this wiper, the motor magnet 91 of switch D, the circuit interrupting relay 92 by way of its armature switch and contact, to ground, whereby the circuit of the relay 62 is opened at the wiper 61 of the switch D, the intermediate armature switch of relay 62 opening the circuit of relay 8 and the left hand armature switch of relay 8 opening the circuit of the employed relay 10, the intermediate armature switch of this relay 10 in turn opening the circuit of the relay 77 whose left hand armature switch in turn opens the circuit for the relay 75. The relay 78 will hold the circuit of relay 77 open sufficiently long to permit the relay 75 to release its armature switches. The motor magnet 88 will operate the ratchet wheel 93 until the wiper 87 encounters a waiting contact free from ground, that is, until it encounters a waiting contact associated with the link connector having a plug 18 which is unemployed. When such an unemployed link connector is encountered the signal lamp 20 will glow so that the operator will take a plug 18 for use to which the signal 20 is individual. By the equipment as illustrated, the plug 18 may be idle whether it is upon the operator's plug board or within the jack of the telephone line over which conversation is finished. Assuming that the desired station 290 is free, a circuit is established for the bottommost armature switch of relay 83, the alternate contact of this armature switch, the intermediate armature switch of relay 94, the normal contact of this armature switch, the winding of relay 95, the wiper 96 and the contact engaged thereby (the wipers of the switch 19 remaining in association with the employed link connector until the relay 75 is released, this relay in releasing its armature with sufficient slowness will permit the establishment of the circuit through relay 95 by way of the wiper 96), the armature switch of relay 97 and its contact, to the grounded battery 28. The locking circuit is established for the relay 95 traceable from the grounded lowermost armature switch of relay 83 through winding of relay 95, the lower armature switch of relay 95 nearest the winding of this relay and its contact, the lower intermediate armature switch of relay 98 and its normal contact to the grounded battery 28.

The relay 95 establishes a circuit traceable from the grounded battery 28, the resistance 99, say of one thousand ohms, the first alternate contact of the upper armature switch of relay 95, this armature switch, the upper intermediate armature switch of relay 98, and its normal contact, the tip of the employed plug 18, the tip spring of the jack receiving the plug, to the upper grounded winding of the called subscriber's differential cutoff relay 29, whereupon this relay 29 is energized to complete the ringing circuit which is traceable from the grounded generator 100 individual to the signal bell at the wanted station, the resistance 101, the armature switch of relay 102 individual to the generator 100 corresponding to the desired station, the right hand pair of contacts of the employed key 68, the intermediate armature switch of relay 95 and its engaged contact, the bottom armature switch of relay 98 and its normal contact, the sleeve spring of the jack 1 of the called line receiving the plug, the alternate contact of the armature switch of the called subscriber's cutoff relay 29, the called subscriber's telephone switch hook 24, the normal contact of this switch hook, the condensers 26 and bell 25 at the called station, the other side of the called line, to the upper grounded winding of the called subscriber's cutoff relay 29. Current is thus supplied to the signal bell at the desired station, a portion of the generator current being diverted to the calling subscriber's instrument to inform the calling subscriber that the called subscriber is being signaled, the path over which a portion of the calling current is diverted to the calling subscriber including the tip spring of the called line jack 1, the tip of the plug 18 engaging this spring, the upper intermediate armature switch of the relay 98 and its normal contact, the top armature switch of relay 95 and its lower alternate contact, the resistance 103 of say twenty-five hundred ohms, the condensers 104, the top armature switch of relay 83 and its engaged contact, the wiper 105 of the employed switch H and its engaged waiting contact, the wiper 63 of the employed switch B and its engaged waiting contact, the topmost switch of relay 43 and its engaged alternate contact, the wiper 44 of the employed switch A and its engaged waiting contact 2 of the calling line, both sides of the calling line and the telephone bridge intervening between the same, and the grounded battery 28 by way of the wiper 48 through obvious connections. The circuit of relay 102 includes a circuit interrupter 106 whereby the ringing current is intermittently included in circuit with the desired line. When the called subscriber removes his telephone receiver from its switch hook in response to the signal conveyed by his bell 25 and while relay 102 is deënergized, a circuit is established for relay 98 traceable from the grounded battery 28, the left hand armature switch of relay 102, the left hand pair of contacts of the depressed key 68, the armature switch immediately above the bottom armature switch of relay 95 and its engaged contact, the winding of relay 98, the bottom armature switch of relay 95 and its engaged contact, the heel of the employed plug 18, the sleeve spring of the called line jack 1, the armature switch of the called subscriber's cutoff relay 29 and its alternate contact, the telephone transmitter bridge at the called station (which is of low resistance compared with the resistance of the bell bridge), the other side of the called line, to the upper grounded winding of the called line cutoff relay 29. Relay 98, which could not be energized by the calling current when passing through the high resistance bell bridge at the called station, is now energized by the calling current when passing through the low resistance telephone bridge at the called station whereby the circuit of the employed generator 100 is open at the normal contact of the bottom armature switch of relay 98. The locking circuit for relay 95 is open at the lower intermediate armature switch of relay 98, whereby relay 95 is deënergized to open another gap in the ringing circuit at the intermediate armature switch of the relay 95. The locking circuit is established for relay 98 traceable from the grounded battery 28, the lower intermediate armature switch of relay 98 and its alternate contact, the winding of relay 98, the bottom armature switch of relay 98 and its left hand alternate contact, the sleeve of the employed plug 18, the sleeve spring of the called line jack 1, both sides of the called line by way of the alternate contact of the armature switch of the called line relay 29, to the upper grounded winding of the relay 29. The upper, intermediate and lower armature switches of relay 98 connect the tip and sleeve of the employed plug 18 with the talking conductors extending to the condensers 104 and 107 which in turn are, by obvious connections, connected with the talking strands of the calling line extension 3 which the calling subscriber has connected with his line and with which calling line extension talking strands the operator has connected the condensers 104, 107 by the wipers 105 and 108 of the employed switch H.

Transmitter battery current is furnished to the calling subscriber from the battery 28 by way of the relay 45 and the upper winding of the calling line cutoff relay 29. Transmitter battery current is furnished to the called subscriber from the battery 28 by way of the winding of relay 98 and the upper winding of the called subscriber's cutoff relay 29. When the relay 98 is energized a substitute holding circuit is established for the relay 83 traceable from the upper grounded armature switch of relay 98, the contact of this armature switch, the upper winding of relay 83, to grounded battery 28. Thus the relays 83 and 65 are controlled jointly by the calling and called subscribers. When the relay 95 was deënergized the resistance 99 and 102 were removed from bridge connection with the line. Relay 95 cannot again be operated until the operator depresses a key 68 or 69, etc., to establish a circuit at 74 to operate relay 75 and relay 75 cannot be operated unless the wipers of the associate switch 19 are resting upon the waiting contacts pertaining to the link connector having the depressed key 68 or 69, etc. When the called subscriber places his receiver upon its switch hook the circuit of relay 98 is broken by the operation of the switch hook, the armature switches of relay 98 are thereupon released to remove all bridge connections governed by the relay 98 from the tip and sleeve strands of the plug 18 so that said plug may remain in the jack without preventing the operation of the signal 20 individual thereto and without preventing other operators from inserting other plugs 18 in jacks 1 in multiple with the jack holding the aforesaid plug 18. When the called subscriber restored his telephone upon his switch hook his relay 29 became deënergized to restore the called line equipment to normal. The released upper armature switch of relay 98 opens the called subscriber's controlling circuits for the relays 83 and 65. When the calling subscriber restores his receiver upon its switch hook the circuit for the calling subscriber's relay 29 and the relay 45 is opened. When the circuit of relay 45 is opened its intermediate armature switch opens the locking circuit for relay 43, the lower released intermediate armature switch of relay 43 thereupon opening the circuits for relays 83 and 65 that include the wiper 60 of the employed switch B and the wiper 86 of the employed switch H. Thus the calling subscriber's controlling circuits of the relays 83 and 65 are broken to render idle the employed calling line extension 3 and the apparatus intervening between the same and the now idle plug 18.

Assuming the called line is busy a circuit is established for the upper winding of relay 94 traceable from the second grounded armature switch to the left of relay 75, the lower contact of this armature switch, the wiper 110 of the switch 19, the waiting contact engaged by this wiper, the upper winding of relay 94, the topmost armature switch of relay 95 and its normal contact, the upper intermediate armature switch of relay 98 and its normal contact, the tip of the employed plug 18, the tip of the called line jack 1, the telephone bridge at the called station, the switch hook thereat, the armature switch of the previously energized called line cutoff relay 29 and its alternate contact, the sleeve spring of the jack 1 engaged by the plug 18 of another position, assuming that the desired line was previously called line, the sleeve of a plug 18 engaging the sleeve spring of this other jack, the bottom armature switch of the relay 98 at the other operator's position, the right hand alternate contact of this armature switch, the winding of relay 98 at the other operator's position, the lower intermediate armature switch of this relay 98, to the grounded battery 28. If the desired line were itself a calling line, the circuit traced would have the sleeve spring of the called line jack replaced by the wiper 48 of the switch A that was employed by the desired line when calling, in effecting its extension, circuit continuing from this wiper 48, through the winding of relay 45, the armature switch of this relay and its contact, to the grounded battery 28. Thus whether the desired line was a previously calling line or a previously called line the relay 94 is energized to open the circuit of relay 95 and to establish the locking circuit of relay 94 traceable from the lower grounded armature switch of relay 83, the alternate contact of this switch, the intermediate armature switch of relay 94, the alternate contact of this switch, the lower winding of relay 94, to the grounded battery 28. The circuit for relay 95 is opened at the normal contact of the intermediate armature switch of relay 94 to leave the plug 18 inserted in the jack of the desired line free of bridge connection. The calling subscriber will know that the desired line is busy owing to the establishment of a busy tone test due to the interruption of a primary circuit that includes an inducing winding 111, the armature switch next above the bottom armature switch of relay 94, the grounded interrupter relay 112 and the armature switch and its contact being desirably connected with a condenser 113. The induced winding 114 has its terminals in the contacts for the two upper armature switches of the relay 94 whereby the induced winding is included in bridge of the talking conductors extending to the calling station by apparent connections whereby the calling subscriber will receive the test and upon placing his receiver upon its switch hook, will render the equipment idle which intervenes between the calling station and the plug 18.

If a plug 18 happens to be in the jack of a wanted line at the operator's section of the board and another plug 18 has been designated for the use of this operator, such operator will apply the tip of the second plug to the sleeve of the first plug and fully depress the key 115 that is individual to the plug being applied whereby an audible test signal is conveyed to both operator and calling subscriber if the line tested is busy, the absence of such signal showing that the line tested is free for connection in which latter event the operator will remove the first plug and insert the second plug thereafter proceeding to depress the key 68 or 69, etc. individual to the wanted station and otherwise proceeding as above described. The audible busy test manifestation is due to the fact that the plug being tested, being connected with the busy line, has connection with battery traceable from the grounded battery 28, the lower intermediate armature switch of relay 98, the alternate contact of this armature switch, the winding of this relay, the lower armature switch of the relay and its right hand alternate contact, to the sleeve of the plug 18 being tested. The test circuit continues from the heel of the plug being tested, the tip of the test plug, the upper intermediate armature switch of relay 98, the normal contact of this armature switch, the uppermost armature switch of relay 95, the normal contact of this switch, the upper winding of relay 94, the wiper 110 of the employed switch 19 and the waiting contact engaged by this wiper, the second grounded armature switch to the left of the winding of relay 75 and its upper contact, to ground, relay 75 being energized owing to the closure of circuit at switch 74 due to the full depression of key 115. Relay 94 is energized to establish a circuit traceable from the grounded induced winding 116, the bottom armature switch of relay 94 and its contact, the closed contacts 117 of key 115, the wiper 118 of the switch 19 and its engaged contact, the test coils 119 of the operator's telephone outfit, to ground. As was previously described, the relay 112 is intermittently energized when the relay 94 is energized so that an intermittent current is passed through the inducing winding 111 which is in primary relation to the secondary coils 114, 116 whereby the calling subscriber as well as the operator have testing current induced in their telephone circuits upon the depression of key 115 while the tip of the testing plug 18 is applied to the sleeve of the plug within the jack of a desired line.

If the calling subscriber 250' at the south exchange should desire connection with a subscriber whose line extends to the main exchange, the operator will employ an idle link connector extending between a switch H and a switch G¹ and having keys 22 associated therewith. The operator will depress the key 22 which is connected with wipers 120, 121, 122 of the switch G¹ to be employed which move over waiting contacts forming terminals of trunk lines 14¹ extending to the main office. When the key 22 individual to the wipers 120, 121, 122 is fully depressed switch spring 123 pertaining to this key 22 is closed against its contact by the operation of the bar 124 which carries pins 125 engageable by the plungers of the switches 22, the closure of the spring 123 closing a circuit traceable from ground through the spring 123, the contact engaged by this spring, the wiper 126 of the associate switch 19, the waiting contact engaged by this wiper, the winding of relay 127, to the grounded battery 28. The left hand armature switch of relay 127 closes a circuit traceable from ground, said switch, its contact, the winding of relay 128, the relay 76, the left hand armature switch of relay 77, to the grounded battery 28, relay 77 having been energized by the calling subscriber as has been described. A locking circuit is established for relay 128 traceable from ground, the intermediate armature switch of relay 128, the contact of this switch, the winding of relay 128, to the grounded battery 28 by the path just traced. The motor magnet 81 of the employed switch H individual to the employed switch G¹ in included in circuit traceable from the left hand grounded armature switch of relay 128, the lower contact of this switch, the wiper 129, the waiting contact engaged by this wiper, the intermediate armature switch of the associate relay 83, the right hand engaged contact of this switch, the motor magnet 81, the interrupter relay 82, to the grounded battery 28 by way of the armature of the interrupter relay.

The switch H will continue in operation until its wiper 80 engages the waiting contact connected with the grounded battery but free of direct ground connection whereupon said switch H will be stopped, all in a manner as has been previously described in connection with the circuit established by the plug 18, similar parts of the equipment present in both switches H which have similar functions being given similar characters of reference. When relay 83 pertaining to the switch H under description is energized its lowermost armature switch establishes a circuit traceable from ground, said armature switch, the alternate contact of this armature switch, the lowermost armature switch of relay 130 and the normal contact of this switch, the motor magnet 131 of the employed switch G¹, the interrupter relay 132, the armature and contact of this relay, to the grounded battery 28. All the wipers of the switch G¹ will rotate, these wipers being fixedly mounted upon a common shaft, until the wiper 122 will engage a waiting contact which is grounded at a relay 133 individual to an unemployed trunk line 14¹ whereupon a circuit is established traceable from the grounded armature switch of relay 133, the contact of this armature switch, the weighting contact engaged by the wiper 122, said wiper, the left hand pair of switch contacts 134 of the key 22 pertaining to the main exchange (the right hand key), the armature of the motor magnet 131, the contact momentarily engaged by this armature, the winding of relay 130, to the grounded battery 28, the relay 130 being energized almost to a point which it will operate by a circuit established through the resistance 135 which will be apparent from the description previously given in connection with relay 83, first mentioned. The circuit of motor magnet 131 is now opened at the normal contact of the lower armature switch of relay 130. The relay 130 establishes a locking circuit for itself traceable from the grounded battery 28, the winding of the relay, the alternate contact of the bottom armature switch of this relay, said armature switch, the bottom armature switch of relay 83 pertaining to the switch H under discussion and the alternate contact of this armature switch, to ground. A circuit is now established for the relay 136 at the main exchange, which circuit is traceable from the grounded impedance coil 137, the uppermost armature switch of relay 130 and its contacts, the right hand pair of contacts of the employed key 22, the wiper 120, the waiting contact engaged by this wiper, one side of the trunk line 14¹, the winding of the relay 136, the other side of the trunk line, the winding of relay 133, (this winding being bridged by a non-inductive resistance 138), the wiper 121 and its engaged waiting contact, the intermediate pair of waiting contacts of the employed key 22, the contacts of the intermediate armature switch of relay 130, the impedance coil 139, to the grounded battery 28. When relay 136 is energized it establishes an obvious circuit for the motor magnet 140, the interrupter relay 141, and the grounded battery 28¹ at the main exchange as is apparent. The switch F¹ having wipers 142, 143 in which the employed trunk line 14¹ terminates will be stepped around until its wiper 144 engages a grounded waiting contact whereupon these wipers and the wiper 145 will be arrested in connection with waiting contacts belonging to an idle trunk line extension 12¹, the selection of the trunk line extension being accomplished by apparatus and circuits similar to that pertaining to the switch B employed by a calling line in connecting an extension 3 with the calling line and it is thought that it is not necessary to describe, further, the operation of the employed switch F¹. By means of the trunk line extension 12¹ which the switch F¹ has selected, an operator at the main exchange is brought into connection with the calling subscriber at the south exchange and this operator will employ a plug 18¹ as the operators at the south exchange employ plugs 18 and similar parts at the main exchange which are similar in function and operation to parts at the south exchange are given similar characters of reference with the addition of prime exponent marks so that it will therefore be unnecessary further to describe the continuation of the calling line at the south exchange to the desired subscriber at the main exchange except that it may be stated that when the employed relay 133 is energized it removes ground from the contact of its armature to prevent the associate trunk line 14¹ from being selected by some other switch G¹, similarly positioned waiting contacts of the switch G¹ in the different operators' positions being in multiple connection and it also may be stated that the relays 130, 133, 136 and 146 (the latter relay being similar in function to relays 43) are controlled directly by the calling south subscriber to the exclusion of the called main subscriber whereby when the calling subscriber restores his telephone upon its switch hook said relays are deënergized to place their associate equipment in idle condition. As in the case of the switch 19 pertaining to the switches H individual to plugs 18, the switch 19 pertaining to the switches H individual to the switches G¹ are operated, when the associate relay 83 is energized, to bring their wipers in engagement with the waiting contacts pertaining to some idle pair of switches G¹ whereupon the lamp 20 individual to this pair of switches glows so that the operator will select a key 22 individual thereto in continuing connections of a calling line by way of a switch G¹.

Each switch G¹ has a set of wipers 147, 148, 149 working over waiting contacts extending to a toll board. Each such switch also has a set of wipers 150, 151, 152 working over waiting contacts extending to an information board. Each such switch also has a set of wipers 153, 154, 155 working over waiting contacts which may be assumed to extend to another exchange marked north exchange, this exchange being assumed, for the sake of example, to be similar to the main exchange. Each of the four sets of wipers of electro-magnetic switch G¹ is individual to a key 22 and each key 22 is individual to such a set of wipers. All of the wipers of a switch G¹ are in fixed relation, being mounted upon a common shaft 156, so that when a switch G¹ is set into operation as a consequence of the depression of any key 22 all of the wipers are turned until the bottom wiper of the set made active by the depression of the associate key 22 encounters a grounded waiting contact as has been described. The remaining set of wipers 22 individual to the remaining keys 22 are not in service owing to the normal position of their associate keys 22, any previously depressed key being restored to normal when a companion key is depressed.

When the relays 75 and 128 are energized, the left hand armature switches of these relays close apparent circuits for the motor operating magnets 157 to operate totalizers 158 whereby separate peg counts may be kept at each operator's position of the connections established by the two classes of link connectors at each operator's position, one class of link connectors including the plugs 18 and the other including the switches G¹. A meter 158 is provided at each position for each class of link connectors. A timing device is provided at each operator's position common to all of the links thereat, which timing device operates a signal 17 when the operator occupies more than the allotted time, say fifteen seconds, in performing her work in establishing connection. When the relay 77 is operated in the establishment of a connection, as previously explained, circuit is established thereby traceable from the grounded circuit interrupter 160, the right hand armature switch of the relay 77 and the contact of this switch, the motor magnet 161, the normally closed right hand contacts of the switch 162, to the grounded battery 28. The constantly operating interrupter 160 intermittently opens and closes the circuit of the motor magnet 161 to move the ratchet wheel 163 to a position in which the arm 164 will engage the intermediate contact at 162 and move it from its normal contact into engagement with its alternate contact whereby circuit is established through the signal device 17 and also preferably through the signal relay 165 which in turn closes circuit through the audible signal device 166. This result would not occur until the ratchet wheel 163 has occupied, say fifteen seconds, in bringing an arm 164 into operation and the ratchet wheel 163 will not have opportunity thus to occasion signals at 17 and 166 if the operator has been sufficiently prompt in performing her work. Each time the operator has concluded her work the relay 77 is deënergized to open the circuit at its right hand armature switch for the motor magnet 161 and to close circuit at its intermediate armature switch for the restoring magnet 167 by way of the normal contact of this intermediate armature switch and the armature switch and the sluggishly operating relay 168 which is maintained in attracted position sufficiently long after the deënergization of the relay 77 to permit the restoring magnet 167 to be energized. When the restoring magnet 167 is deënergized it withdraws the holding pawl 169 from engagement with the ratchet wheel 163 to permit the spring 170 to restore the ratchet wheel to normal whereupon the switch at 162 is restored to normal if it was previously operated. The ratchet wheel 163 again requiring the allotted time for the purpose of operating the switch at 162.

Each operator is provided with two keys marked 171 at the south exchange and 171¹ at the main exchange, each of the two keys at each operator's position being individual to a relay 10, one key thus being common to the calling line extensions 3 (or 3¹) pertaining to one pair of switches D (or D¹) and the other key thus being common to the calling line extensions 3 (or 3¹) pertaining to the other pair of switches D (or D¹). The receiving operator operates such a key when she is unable to converse with the calling subscriber, she being apprised of the incoming call by the signal at lamp 172 individual to the key and whose circuit is established each time a call is initiated by way of the next to the bottom armature switch of the associate relay 10. When such a key is depressed the receiving operator is thrown into communication with the information operator in whose presence the lamps 30 individual to the subscriber's lines are located and the receiving operator instructs the information operator to attend to the connection and the information operator will do so by the aid of suitable cord equipment indicated at 173. The information operator will use the cord equipment 173 which may be any well known cord equipment, in the usual way to ascertain the wants of the calling subscriber. When the answering plug of the equipment 173 is inserted in the jack of the calling line, the grounded battery 28 will be included in circuit with the upper winding of the calling line cutoff relay 29 by an apparent path including the tip side of the line whereby such relay is operated to release the associate line relay 5 to prevent the operation of the relay 6 common to the group of fifty lines whereby faulty calls are obviated.

When a key, 171, is depressed one circuit is established traceable from the grounded battery 28, the resistance coil 174, say of ten ohms, the left hand pair of contacts of the depressed key, the wiper 66 of the employed switch D, the waiting contact engaged by such wiper, the intermediate armature switch of relay 62 and its contact, the wiper 61 of the employed switch B and its waiting contact, the upper intermediate armature switch of the relay 43 and its contact, the uppermost armature switch of relay 45 and its contact, said relay, to the grounded battery 28. The ten ohm resistance 174 is thus placed in shunt of the two hundred fifty ohm relay 45 to deënergize the relay to allow its armature switches to fall away, the circuit for the relay 45 being at the time maintained by the pair of contacts immediately to the right of the depressed key which are closed before the left hand pair of contacts. The maintaining circuit for the relay 45 is traceable from the grounded battery 28, the winding of the relay 45, the two alternate contacts of the lower intermediate armature switch of the relay 45 and said armature switch, the wiper 60 and its engaged waiting contact, the wiper 61 of the switch B and its engaged waiting contact, the upper armature switch of relay 58 associated with said switch D and its contact, the right hand armature switch of relay 62 and its contact, to the pair of contacts upon the right of the depressed key 171. A holding circuit for the relay 62 is at the same time established which will be apparent.

The relay 45 being released, the relay 43 being maintained energized, a circuit is established traceable from the grounded calling generator 175, the condenser 176, the lowermost armature switch of relay 43 and its contact, the lowermost armature switch of relay 45 and its contact, the wiper 34 of the associate switch A, the waiting contact engaged by this wiper, the signal 30 individual to the calling line that operated the signal 172 and which signal 30 is located in the presence of the information operator who attends to the calling line as requested by the receiving operator. When the information operator acknowledges the call from the receiving operator the receiving operator will release the depressed key to bring the equipment associating the calling line with her telephone in an idle condition. If it should happen that the receiving operator taking the call of the calling subscriber should desire to communicate with the distant operator who is to complete the connection with the desired line, she may do so by holding the selected key 22 used for extending the calling subscriber into connection with such distant operator to maintain the circuit for relay 127 closed at 123, the intermediate armature switches of relay 127 connecting the receiving operator's equipment 9 with the talking strands of the employed link connector having the employed switches H and G¹, the wipers 177 and 178 of the employed switch 19 being included in this operator's talking circuit. The right hand armature switch of relay 127 maintains the circuit for the relay 8 of the receiving operator's equipment energized to prevent faulty operation.

The keys associated with the link connectors at the operators' positions are supplemented by keys 179 which, when depressed, will place ground upon the waiting contacts engaged by the wipers 87 of the associate switches 19 to render the associate links artificially busy to prevent them from being selected for use by the switches 19.

The claims herein are drawn to cover a link connector or switching mechanism intervening between one switching section and a plurality of other switching sections in novel manner, the telephone exchange system shown, however, including characteristics not herein claimed but which are claimed in other applications, cross reference being made to my prior applications Serial No. 709,422, filed July 15, 1912, in which is disclosed and variously claimed a telephone exchange system including telephone lines, a plurality of link connectors each provided with operator controlled electro-magnetic switches to connect the same with calling and called lines and selector mechanism for selecting link connectors that are free for selection, said link connectors performing their line joining function independently of the selector mechanism; Serial No. 709,430, filed July 15, 1912, in which is disclosed and variously claimed a telephone exchange system provided with selector switches that are operated to connect operators' switching devices with the connector selecting switches, the line joining function being performed by the connector switches and connector selector switches independently of the first aforesaid selector switches; Serial No. 759,026, filed April 5, 1913, in which is disclosed and variously claimed a telephone exchange system provided with improved means for counting the connections effected between calling and called subscribers and for recording the counts and the periods of time during which the counts are made, there being also included in this system means whereby a number of calling lines may simultaneously have access to the same operator; and Serial No. 759,029, filed April 5, 1913, in which is disclosed and variously claimed a telephone exchange system including telephone lines extending to an exchange; contacts for connection with calling lines; selector switches operable by calling lines for connecting idle contacts with calling lines; link connectors for extending calling lines; and operator controlled electro-magnetic mechanism at the exchange for causing engagement between contacts that said selector switches have connected with calling lines and contacts belonging to calling line ends of link connectors.

While I have herein shown and particularly described the preferred embodiment of my invention I do not wish to be limited to the precise details of construction and circuit arrangement shown as changes may readily be made without departing from the spirit of the invention.

Having thus described my invention I claim as new and desire to secure by Letters Patent the following:—

1. A telephone exchange system including telephone lines extending to a switching section; telephone lines extending to other switching sections; and a link connector intervening between the first switching section and the other switching sections, said link connector including a telephone line extension for connection with a telephone line extending to the first switching section, and a telephone line extension for each of the second switching sections for extending the telephone lines extending thereto, the first telephone line extension being common to the latter telephone line extensions and the latter telephone line extensions being in permanent circuit relation with the former.

2. A telephone exchange system including telephone lines extending to a switching section; telephone lines extending to other switching sections; a link connector intervening between the first switching section and the other switching sections, said link connector including a telephone line extension for connection with a telephone line extending to the first switching section, and a telephone line extension for each of the second switching sections for extending the telephone lines extending thereto, the first telephone line extension being common to the latter telephone line extension and the latter telephone line extensions being in permanent circuit relation with the former; and switching means for excluding some of the second mentioned telephone line extensions from telephonic connection with the first mentioned telephone line extension.

3. A telephone exchange system including telephone lines extending to a switching section; telephone lines extending to other switching sections; a link connector intervening between the first switching section and the other switching sections, said link connector including a telephone line extension for connection with a telephone line extending to the first switching section, and a telephone line extension for each of the second switching sections for extending the telephone lines extending thereto, the first telephone line extension being common to the latter telephone line extensions and the latter telephone line extensions being in permanent circuit relation with the former; and switching means for limiting the first mentioned telephone line extension to telephonic connection with a selected one of the second mentioned telephone line extensions.

4. A telephone exchange system including telephone lines extending to a switching section; telephone lines extending to other switching sections; a link connector intervening between the first switching section and the other switching sections, said link connector including a telephone line extension for connection with a telephone line extending to the first switching section, and a telephone line extension for each of the second switching sections for extending the telephone lines extending thereto, the first telephone line extension being common to the latter telephone line extensions and the latter telephone line extensions being in permanent circuit relation with the former; and an electro-magnetic switch common to the second telephone line extensions and provided with switching parts individual to each of the second telephone line extensions for extending the same into connection with the telephone lines extending to the respective second mentioned switching sections.

5. A telephone exchange system including telephone lines extending to a switching section; telephone lines extending to other switching sections; a link connector intervening between the first switching section and the other switching sections, said link connector including a telephone line extension for connection with a telephone line extending to the first switching section, and a telephone line extension, for each of the second switching sections for extending the telephone lines extending thereto, the first telephone line extension being common to the latter telephone line extensions and the latter telephone line extensions being in permanent circuit relation with the former; switching means for excluding some of the second mentioned telephone line extensions from telephonic connection with the first mentioned telephone line extensions; and an electro-magnetic switch common to the second telephone line extensions and provided with switching parts individual to each of the second telephone line extensions for extending the same into connection with the telephone lines extending to the respective second mentioned switching sections.

6. A telephone exchange system including telephone lines extending to a switching section; telephone lines extending to other switching sections; a link connector intervening between the first switching section and the other switching sections, said link connector including a telephone line extension for connection with a telephone line extending to the first switching section, and a telephone line extension for each of the second switching sections for extending the telephone lines extending thereto, the first telephone line extension being common to the latter telephone line extensions and the latter telephone line extensions being in permanent circuit relation with the former; switching means for limiting the first mentioned telephone line extension to telephonic connection with a selected one of the second mentioned telephone line extensions; and an electro-magnetic switch common to the second telephone line extensions and provided with switching parts individual to each of the second telephone line extensions for extending the same into connection with the telephone lines extending to the respective second mentioned switching sections.

7. A telephone exchange system including telephone lines extending to a switching section; telephone lines extending to other switching sections; a link connector intervening between the first switching section and the other switching sections, said link connector including a telephone line extension for connection with a telephone line extending to the first switching section, and a telephone line extension for each of the second switching sections for extending the telephone lines extending thereto, the first telephone line extension being common to the latter telephone line extensions and the latter telephone line extensions being in permanent circuit relation with the former; an electro-magnetic switch common to the second telephone line extensions and provided with sets of wipers individual to the second telephone line extensions and a plurality of sets of waiting contacts for each set of wipers; and additional telephone line extensions terminating in said waiting contacts and intervening between said waiting contacts and the second aforesaid switching sections, the telephone line extensions extending between each of the second mentioned switching sections and the electro-magnetic switch terminating in the waiting contacts pertaining to a set of wipers of such switch.

8. A telephone exchange system including telephone lines extending to a switching section; telephone lines extending to other switching sections; a link connector intervening between the first switching section and the other switching sections, said link connector including a telephone line extension for connection with a telephone line extending to the first switching section, and a telephone line extension for each of the second switching sections for extending the telephone lines extending thereto, the first telephone line extension being common to the latter telephone line extensions and the latter telephone line extensions being in permanent circuit relation with the former; switching means for excluding some of the second mentioned telephone line extensions from telephonic connection with the first mentioned telephone line extension; an electro-magnetic switch common to the second telephone line extensions and provided with sets of wipers individual to the second telephone line extensions, and a plurality of sets of waiting contacts for each set of wipers; and additional telephone line extensions terminating in said waiting contacts and intervening between said waiting contacts and the second aforesaid switching sections, the telephone line extensions extending between each of the second mentioned switching sections and the electro-magnetic switch terminating in the waiting contacts pertaining to a set of wipers of such switch.

9. A telephone exchange system including telephone lines extending to a switching section; telephone lines extending to other switching sections; a link connector intervening between the first switching section and the other switching sections, said link connector including a telephone line extension for connection with a telephone line extending to the first switching section, and a telephone line extension for each of the second switching sections for extending the telephone lines extending thereto, the first telephone line extension being common to the latter telephone line extensions and the latter telephone line extensions being in permanent circuit relation with the former; switching means for limiting the first mentioned telephone line extension to telephonic connection with a selected one of the second mentioned telephone line extensions; an electro-magnetic switch common to the second telephone line extensions and provided with sets of wipers individual to the second telephone line extensions, and a plurality of sets of waiting contacts for each set of wipers; and additional telephone line extensions terminating in said waiting contacts and intervening between said waiting contacts and the second aforesaid switching sections, the telephone line extensions extending between each of the second mentioned switching sections and the electro-magnetic switch terminating in the waiting contacts pertaining to a set of wipers of such switch.

10. A telephone exchange system including telephone lines extending to a switching section; telephone lines extending to other switching sections; a link connector intervening between the first switching section and the other switching sections, said link connector including a telephone line extension for connection with a telephone line extending to the first switching section, and a telephone line extension for each of the second switching sections for extending the telephone lines extending thereto; and an electro-magnetic switch common to the second telephone line extensions and provided with switching parts individual to each of the second telephone line extensions for extending the same into connection with the telephone lines extending to the respective second mentioned switching sections.

11. A telephone exchange system including telephone lines extending to a switching section; telephone lines extending to other switching sections; a link connector intervening between the first switching section and the other switching sections, said link connectors including a telephone line extension for connection with a telephone line extending to the first switching section, and a telephone line extension for each of the second switching sections for extending the telephone lines extending thereto; switching means for excluding some of the second mentioned telephone line extensions from telephonic connection with the first mentioned telephone line extensions; and an electro-magnetic switch common to the second telephone line extensions and provided with switching parts individual to each of the second telephone line extensions for extending the same into connection with the telephone lines extending to the respective second mentioned switching sections.

12. A telephone exchange system including telephone lines extending to a switching section; telephone lines extending to other switching sections; a link connector intervening between the first switching section and the other switching sections, said link connector including a telephone line extension for connection with a telephone line extending to the first switching section, and a telephone line extension for each of the second switching sections for extending the telephone lines extending thereto; switching means for limiting the first mentioned telephone line extension to telephonic connection with a selected one of the second mentioned telephone line extensions; and an electro-magnetic switch common to the second telephone line extensions and provided with switching parts individual to each of the second telephone lines extensions for extending the same into connection with the telephone lines extending to the respective second mentioned switching sections.

13. A telephone exchange system including telephone lines extending to a switching section; telephone lines extending to other switching sections; a link connector intervening between the first switching section and the other switching sections, said link connector including a telephone line extension for connection with a telephone line extending to the first switching section, and a telephone line extension for each of the second switching sections for extending the telephone lines extending thereto; an electro-magnetic switch common to the second telephone line extensions and provided with sets of wipers individual to the second telephone line extensions and a plurality of sets of waiting contacts for each set of wipers; and additional telephone line extensions terminating in said waiting contacts and intervening between said waiting contacts and the second aforesaid switching sections, the telephone line extensions extending between each of the second mentioned switching sections and the electro-magnetic switch terminating in the waiting contacts pertaining to a set of wipers of such switch.

14. A telephone exchange system including telephone lines extending to a switching section; telephone lines extending to other switching sections; a link connector intervening between the first switching section and the other switching sections, said link connector including a telephone line extension for connection with a telephone line extending to the first switching section, and a telephone line extension for each of the second switching sections for extending the telephone lines extending thereto; switching means for excluding some of the second mentioned telephone line extensions from telephonic connection with the first mentioned telephone line extensions; an electro-magnetic switch common to the second telephone line extensions and provided with sets of wipers individual to the second telephone line extensions, and a plurality of sets of waiting contacts for each set of wipers; and additional telephone line extensions terminating in said waiting contacts and intervening between said waiting contacts and the second aforesaid switching sections, the telephone line extensions extending between each of the second mentioned switching sections and the electro-magnetic switch terminating in the waiting contacts pertaining to a set of wipers of such switch.

15. A telephone exchange system including telephone lines extending to a switching section; telephone lines extending to other switching sections; a link connector intervening between the first switching section and the other switching sections, said link connector including a telephone line extension for connection with a telephone line extending to the first switching section and a telephone line extension for each of the second switching sections for extending the telephone lines extending thereto; switching means for limiting the first mentioned telephone line extension to telephonic connection with a selected one of the second mentioned telephone line extensions; an electro-magnetic switch common to the second telephone line extensions and provided with sets of wipers individual to the second telephone line extensions, and a plurality of sets of waiting contacts and intervening between said waiting contacts and the second aforesaid switching sections, the telephone line extensions extending between each of the second mentioned switching sections and the electro-magnetic switch terminating in the waiting contacts pertaining to a set of wipers of such switch.

16. A telephone exchange system including telephone lines extending to one switching section; telephone lines extending to other switching sections; an electro-magnetic switch; telephone line extensions intervening between the second mentioned switching sections and said electro-magnetic switch; a telephone line extension intervening between the first switching section and said electro-magnetic switch; and means whereby said telephone line extension may be interchangeably associated with said telephone line extensions by way of said electro-magnetic switch.

17. A telephone exchange system including telephone lines extending to one switching section; telephone lines extending to other switching sections; an electro-magnetic switch including a plurality of sets of wipers and a plurality of sets of waiting contacts for each set of wipers; telephone line extensions intervening between the second mentioned switching sections and terminating in said waiting contacts, the telephone line extensions pertaining to each of the second mentioned switching sections having the waiting contacts of one set of wipers; a telephone line extension intervening between the first switching section and said electro-magnetic switch; and means whereby said telephone line extension may be interchangeably associated with said sets of wipers.

18. A telephone exchange system including telephone lines extending to one switching section; telephone lines extending to other switching sections; an electro-magnetic switch; telephone line extensions intervening between the second mentioned switching sections and said electro-magnetic switch; and a telephone line extension intervening between the first switching section and said electro-magnetic switch and common to said telephone line extensions.

19. A telephone exchange system including telephone lines extending to one switching section; telephone lines extending to other switching sections; an electro-magnetic switch including a plurality of sets of wipers and a plurality of sets of waiting contacts for each set of wipers; telephone line extensions intervening between the second mentioned switching sections and terminating in said waiting contacts, the telephone line extensions pertaining to each of the second mentioned switching sections having the waiting contacts of one set of wipers; and a telephone line extension intervening between the first switching section and said electro-magnetic switch and common to the wipers thereof.

20. A telephone exchange system including telephone lines extended to one switching section; telephone lines extended to other switching sections; link connectors intervening between said other switching sections and the first switching section; and a plurality of operator controlled electro-magnetic switching devices pertaining to different link connectors operable at the first switching section for connecting contacts belonging to calling lines which are extended to the first switching section with contacts belonging to selected link connectors extended to the other switching sections.

In witness whereof, I hereunto subscribe my name this 30th day of April A. D., 1913.

MORTON L. JOHNSON.

Witnesses:
G. L. CRAGG,
ETTA L. WHITE.